US008959230B2

(12) United States Patent
Hsu et al.

(10) Patent No.: US 8,959,230 B2
(45) Date of Patent: Feb. 17, 2015

(54) METHOD AND APPARATUS FOR NEGOTIATION OF TRANSMISSION PARAMETERS FOR BROADCAST/MULTICAST SERVICES

(75) Inventors: Raymond T. Hsu, San Diego, CA (US); An Mei Chen, San Diego, CA (US); Jun Wang, San Diego, CA (US); Nikolai K. N. Leung, Takoma, MD (US); Nileshkumar J. Parekh, San Deigo, CA (US); Ragulan Sinnarajah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2790 days.

(21) Appl. No.: 10/059,736

(22) Filed: Jan. 28, 2002

(65) Prior Publication Data
US 2003/0145064 A1 Jul. 31, 2003

(51) Int. Cl.
*G06F 15/16* (2006.01)
*H04W 76/00* (2009.01)
(Continued)

(52) U.S. Cl.
CPC ........... *H04W 76/002* (2013.01); *H04L 12/189* (2013.01); *H04L 69/04* (2013.01); *H04L 69/22* (2013.01); *H04L 12/1859* (2013.01); *H04W 28/06* (2013.01); *H04W 48/12* (2013.01); *H04W 48/14* (2013.01); *H04W 88/12* (2013.01)
USPC ............................. 709/227; 709/228; 709/230

(58) Field of Classification Search
USPC ........................................................ 709/204
See application file for complete search history.

(56) References Cited

U.S. PATENT DOCUMENTS

| 5,101,501 A | 3/1992 | Gilhousen et al. |
| 5,867,666 A * | 2/1999 | Harvey .......................... 709/239 |

(Continued)

FOREIGN PATENT DOCUMENTS

| EP | 1001614 A1 | 5/2000 |
| EP | 1 158 748 A2 | 11/2001 |

(Continued)

OTHER PUBLICATIONS

Floyd et al. "A Reliable Multicast Framework for Light-Weight Sessions and Application Level Framing," IEEE/ACM Transactions on Networking, IEEE Inc. New York, U.S., vol. 5, No. 6, Dec. 1, 1997, pp. 784-803.

(Continued)

*Primary Examiner* — Azizul Choudhury
(74) *Attorney, Agent, or Firm* — Kevin T. Cheatham (57) ABSTRACT

A method and apparatus for negotiating capability information for a broadcast service in a communication system. In one embodiment, the generic capabilities are pre-configured in BSC, which provides the generic capability information to MS and to PDSN based on a listing of available BC services and the corresponding capabilities. Another embodiment pre-configures PDSN with the generic capability information. According to still another embodiment, PDSN is pre-configured with the generic capability information, wherein the MS queries the PDSN directly for generic capability information via a PPP connection. In yet another embodiment, the MS queries the PCF, which in turn queries all of the PDSN in the system. The PDSN responsible for the BC responds to the query. Where multiple PDSNs may support the BC, the first to respond using multicast addressing obviates the need for the others to respond.

16 Claims, 6 Drawing Sheets

(51) Int. Cl.
*H04L 12/18* (2006.01)
*H04L 29/06* (2006.01)
*H04W 28/06* (2009.01)
*H04W 48/12* (2009.01)
*H04W 48/14* (2009.01)
*H04W 88/12* (2009.01)

(56) References Cited

U.S. PATENT DOCUMENTS

| | | | | |
|---|---|---|---|---|
| 5,878,040 | A * | 3/1999 | Peirce et al. | 370/389 |
| 6,032,197 | A | 2/2000 | Birdwell et al. | |
| 6,058,106 | A * | 5/2000 | Cudak et al. | 370/313 |
| 6,088,337 | A * | 7/2000 | Eastmond et al. | 370/280 |
| 6,097,720 | A | 8/2000 | Araujo et al. | |
| 6,157,649 | A * | 12/2000 | Peirce et al. | 370/401 |
| 6,226,686 | B1 * | 5/2001 | Rothschild et al. | 709/245 |
| 6,300,887 | B1 | 10/2001 | Le | |
| 6,308,219 | B1 * | 10/2001 | Hughes | 709/238 |
| 6,330,599 | B1 * | 12/2001 | Harvey | 709/223 |
| 6,822,952 | B2 * | 11/2004 | Abrol et al. | 370/338 |
| 6,834,050 | B1 * | 12/2004 | Madour et al. | 370/392 |
| 6,876,640 | B1 * | 4/2005 | Bertrand et al. | 370/331 |
| 6,934,751 | B2 | 8/2005 | Jayapalan et al. | |
| 6,967,964 | B1 | 11/2005 | Svanbro et al. | |
| 7,031,736 | B2 * | 4/2006 | Le et al. | 455/502 |
| 8,126,127 | B2 * | 2/2012 | Hsu et al. | 379/201.05 |
| 2002/0018010 | A1 | 2/2002 | Le | |
| 2002/0196743 | A1 | 12/2002 | Thalanany et al. | |
| 2003/0054807 | A1 * | 3/2003 | Hsu et al. | 455/414 |
| 2003/0073453 | A1 * | 4/2003 | Basilier | 455/503 |
| 2003/0134651 | A1 | 7/2003 | Hsu | |
| 2004/0125793 | A1 | 7/2004 | Yi et al. | |

FOREIGN PATENT DOCUMENTS

| | | |
|---|---|---|
| JP | 2001177564 A | 6/2001 |
| JP | 2001244993 | 9/2001 |
| KR | 20000035074 | 6/2000 |
| KR | 20014512 | 1/2001 |
| KR | 20010092401 A | 10/2001 |
| TW | 454132 B | 9/2001 |
| WO | 00/57601 | 9/2000 |
| WO | WO0079738 A1 | 12/2000 |
| WO | WO0139525 A2 | 5/2001 |
| WO | 01/54354 A1 | 7/2001 |
| WO | WO0184267 A2 | 11/2001 |

OTHER PUBLICATIONS

"ITU-T Recommendation H.323: Visual telephone systems and equipment for local area networks which provide a non-guaranteed quality of service," Nov. 1996, pp. 1-71.

Armstrong et al. "RFC 1301 Multicast Transport Protocol," Request for Comments, Feb. 1992, pp. 1-37.

"Crs to 3G work Item Point to Point Services" ETSI SMG3 Plenary Meeting #7, Madrid, Spain; Mar. 13-15, 2000. pp. 1-3 plus cover page, paragraph 11.7.

D. Perkins: "RFC 1172: The Point-to-Point (PPP) Initial Configuration Options" Request for Comments, Jul. 1990, pp. i-ii, pp. 1-38.

ETSI: "Digital Cellular telecommunications systems (Phase 2+) (GSM); Universal Mobile Telecommunications Systems (UMTS); Interworking between the public Land Mobile Network (PLMN) supporting Packet based services and Packet data Networks (PDN) (3GPP TS 29.061 version 3.7.0 Release 1999)" ETS TS 129061 V3.7.0, XX, XX, Sep. 2001, pp. 1-71, XP002244647.

International Search Report—PCT/US2003/001539, International Search Authority—United States—Aug. 9, 2003.

3GPP2 A. S0017-0v1.0, "Interoperability Specification (IOS) for CDMA 2000 Access Network Interfaces—Part 7 (A10 and A11 Interfaces)".

"3rd Generation partnership project; Technical specification group services and system aspects; multimedia broadcast/multicast service: (release 5)" 3GPP TR 23 846 1.0.0, )(X, XX, Jan. 22, 2002, pp. 1-14, XP002244907 paragraph 08.1!, category "A".

Engan, Casner.Bormann: "RFC 2509. IP Header Compression over PPP" Request for Comments, Feb. 1999, XP002251 751 paragraph 0001!, de category "A".

G. McGregor, "The PPP Internet Protocol Control Protocol (IPCP)" Network Working Group: RFC 1332, p. 7, May 1, 1992.

Girish Patel, Steven Dennett, "The 3GPP and 3GPP2 Movements Toward an All-IP Mobile Network", IEEE Personal Communications, Aug. 2000.

International Search Report—PCT/US03/02518, International Search Authority—United States—Oct. 23, 2003.

McAuley A J et al: "Mobile Multicast Proxy" MILCOM 1999. IEEE Military Communications Conference Proceedings. Atlantic City, No., Oct. 31-Nov. 3, 1999, IEEE Military Communications Conference, New York, NY: IEEE, US, vol. vol. 1 of 2 Conf. 18, Oct. 31, 1999, pp. 631-635, XP000921 988 ISBN: 0-7803-5539-3 the whole document, de category "A".

Perkins, C., "IP Mobility Support", IBM, Network Working Group, Request for Comments; 2002, pp. 1-79 (Oct. 1996).

S. E. Deering, "Host Extensions for IP Multicasting", RFC 988, Jul. 1986.

W. Fenner, Xerox PARC; Network Working Group; "Internet Group Management Protocol", Version 2; The Internet Society, Nov. 1997; RFC 2236; pp. 1-24.

* cited by examiner

METHOD AND APPARATUS FOR NEGOTIATION OF TRANSMISSION PARAMETERS FOR BROADCAST/MULTICAST SERVICES

REFERENCE TO CO-PENDING APPLICATIONS FOR PATENT

The present application for patent is related to U.S. patent application Ser. No. 10/051,777, entitled "METHOD AND APPARATUS FOR FLOW TREATMENT AND MAPPING ON A MULTICAST/BROADCAST SERVICE," by Raymond Hsu, assigned to the assignee hereof and hereby expressly incorporated by reference.

FIELD

The present invention relates to wireless communication systems generally and specifically, to methods and apparatus for negotiation of transmission parameters for broadcast/multicast services.

BACKGROUND

There is an increasing demand for packetized data services over wireless communication systems. As traditional wireless communication systems are designed for voice communications, the extension to support data services introduces many challenges. Specifically, provision of uni-directional services, such as broadcast service where video and audio information is streamed to a subscriber, has a unique set of requirements and goals. Such services may have large bandwidth requirements, wherein system designers seek to minimize transmission of overhead information. Additionally, specific information is needed to forward and/or access the broadcast transmissions, such as processing parameters and protocols. A problem exists in transmitting the broadcast-specific information while optimizing use of available bandwidth.

There is a need, therefore, for an efficient and accurate method of transmitting data in a wireless communication system. Further, there is a need for an efficient and accurate method of providing service-specific information.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

An exemplary embodiment of a wireless communication system employs a method of header compression that reduces the size of each header while satisfying the accuracy and transmission requirements of the system. The exemplary embodiment supports a uni-directional broadcast service. The broadcast service provides IP packets to multiple users. Typically the IP packets comprise video and/or audio streams. Subscribers to the broadcast service "tune in" to a designated channel to access the broadcast transmission. As the bandwidth requirement for high speed transmission of video broadcasts is great, it is desirable to reduce the size of any overhead associated with such broadcast transmission.

Sometimes broadcast service may be used as a service that sends information to a group of users based on their geographic location. This could also be considered "un-addressed" messaging. Examples would be to broadcast local information such as traffic or weather alerts based on a cell/sector or specific paging zone. All users in that area that are capable of receiving broadcast information would receive it.

Broadcast services may also be used for multicasting. Multicast may refer to the ability to broadcast information to a specific set of users based on their subscription to a user group. The user group may be maintained by an administrator. In addition, the user group may be publicly subscribable (e.g., sign-up for advertisement, stock quotes, etc.), or it may be closed to public subscription (e.g., corporate list). The multicast list may also be configured to have the mobile device acknowledge receipt of the message as defined by the user group administrator. This could be considered addressable messaging.

Multicast user groups are generally considered to be closed groups. In these groups a member typically subscribes to the service (public multicast group) by sending a request to the administrator, by some web interface, or other mechanism. A private multicast group is restricted to membership explicitly by the administrator manually adding members.

Broadcast services can also be divided into public and private groups. A public broadcast group is used for sending geographic specific information. All devices in the specific geographic area that have broadcast capability are in the public group and will receive this information. Examples of broadcast information for this public broadcast type are emergency weather alerts, traffic conditions, etc. Private broadcast groups are targeted to sending specific information to a specific group of devices in a particular area. One example of this type of service would be location-based advertising. One possible scenario for this example is where a user may elect to receive specific advertisements when he or she is at a mall, but not at other times.

The following discussion develops the exemplary embodiment by first presenting a spread-spectrum wireless communication system generally. Next, the broadcast service is introduced, wherein the service is referred to as High Speed Broadcast Service (HSBS). Interfaces between the base station and the packet data serving node are introduced for user traffic and signaling. The messages for establishing an A10 connection for user traffic are discussed. Flow treatment and mapping data for conveying treatment and mapping information to the packet data serving node is illustrated and explained. Examples of sending the flow treatment and mapping data from the base station to the packet data serving node are shown. The details of mapping a flow to the correct interface, presenting the use of a service option parameter to define the specifics of a compression algorithm are shown. Finally, several benefits of using the flow treatment and mapping data to convey treatment and mapping information are set forth.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, an unidirectional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the WCDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA200 standard of protocols. Alternate embodiments may incorporate another standard. Still other embodiments may apply the compression methods disclosed herein to other types of data processing systems.

High Speed Broadcast System (HSBS)

Figure 1:
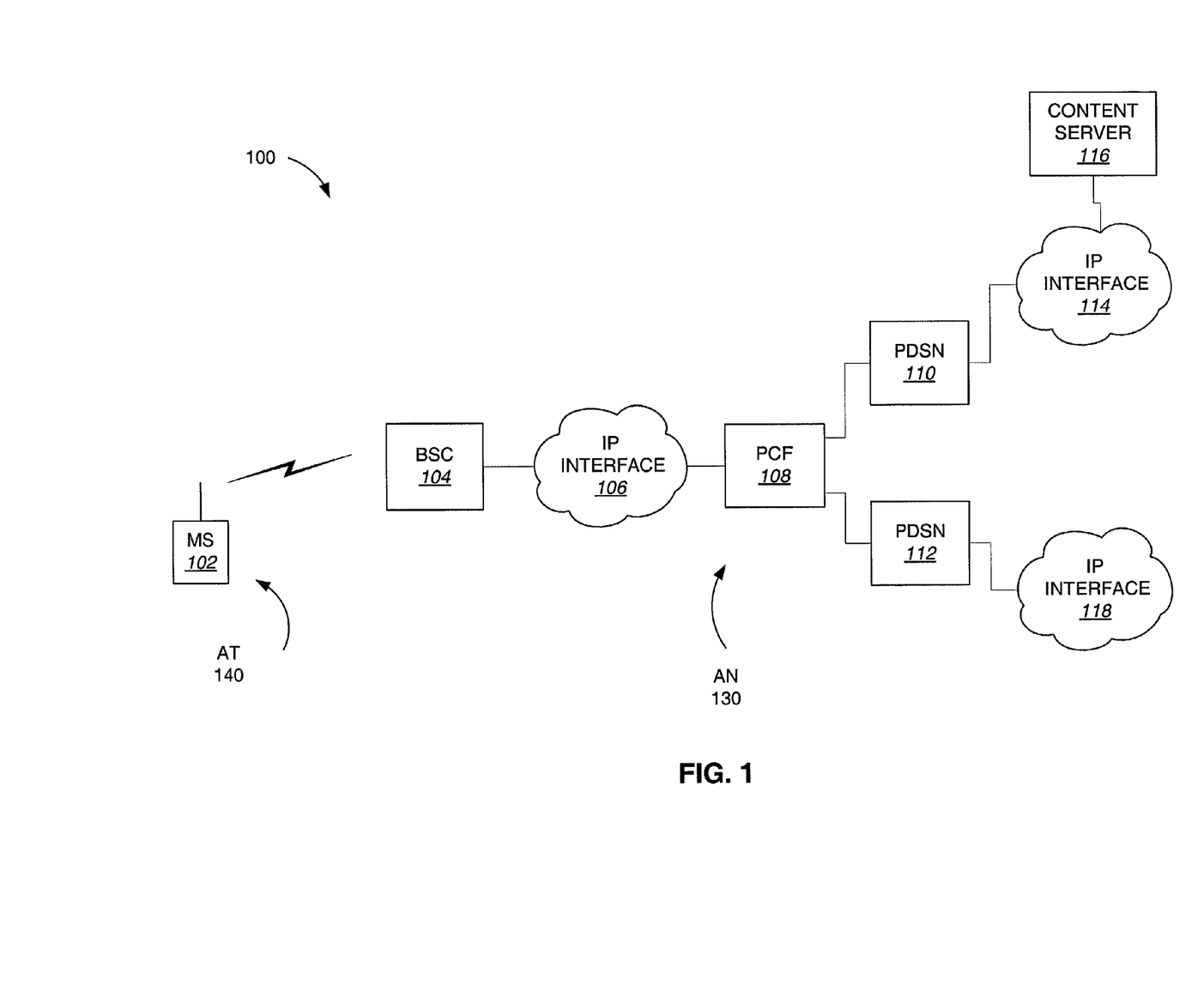
FIG. 1 is a diagram of a wireless communication system supporting broadcast transmissions.

A wireless communication system 100 is illustrated in FIG. 1, wherein IP packets are provided by Content Server (CS) 116 via an Internet Protocol (IP) interface 114 to at least one Packet Data Serving Node (PDSN) 110. A CS 116 provides data that is transmitted as Internet Protocol data packets ("IP packets") across the IP interface 114. Many different kinds of data may be transmitted by the CS 116. For example, audio data, video data, textual data, electronic files, etc., may be transmitted by the CS 116 through the IP interface 114. Video and audio information may be from televised programming or a radio transmission. Thus, the CS 116 may be a server configured to serve video data, audio data, etc. In one embodiment, the CS 116 may be a web server connected to the Internet and functioning to serve data to users browsing the World Wide Web. The IP interface 114 may be the Internet, an intranet, a private IP network, etc.

The PDSN 110 receives and processes the IP packets to transmit them to a Packet Control Function (PCF) node 108. The PCF 108 then communicates with Base Station Controller (BSC) 104 via an IP interface 106. Note that PCF 108 may be in communication with multiple BSCs (not shown) or alternatively with one or more Base Stations (BSs). Once BSC 104 receives the data, it then sends the data to one or more Mobile Stations (MSs) such as MS 102. PCF 108 is also in communication with PDSN 112, which communicates with IP interface 118. In the exemplary embodiment, the communications from the BSC 104 toward the PCF 108 are wireline communications, whereas the communication of the BSC 104 to the MS 102 are wireless communications. The wireless communications are performed on a network referred to as the Access Network (AN) 130, while the MS 102 is referred to as the Access Terminal (AT) 140.

The information from a CS 116 is provided as packetized data, such as in IP packets. The PDSN 110 processes the IP packets for distribution within an AN 130. As illustrated, the AN 130 is defined as the portions of the system 100 including a BSC 104, IP interfaces 106, 114, 118, PCF 108, PDSNs 110, 112, and CS 116. For HSBS service, the BSC 104 receives the stream of information from the PDSN 110 and provides the information on a designated channel to subscribers within the system 100.

The HSBS is a stream of information provided over an air interface in a wireless communication system. The "HSBS channel" refers to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code that carries broadcast traffic. The Broadcast Channel, BCH, corresponds to a single CDM channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a service provider is referred to as the CS 116, wherein the CS 116 advertises the availability of such high-speed broadcast service to the system users. Any user desiring to receive the HSBS service may subscribe with the CS 116. The subscriber is then able to scan the broadcast service schedule in a variety of ways that may be provided by the CS 116. For example, the broadcast content may be communicated through advertisements, Short Management System (SMS) messages, Wireless Application Protocol (WAP), and/or some other means generally consistent with and convenient for mobile wireless communications. BSC 104 transmits HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS 102 reads the overhead messages and learns the appropriate configurations. The MS 102 then tunes to the frequency containing the HSBS channel, and receives the broadcast service content.

In order for the MSs 102 to discover and listen to broadcast channels successfully, various broadcast service related parameters are transmitted over the air interface. The broadcast service is designed to support different protocol options in the protocol stack. This requires the receivers of the broadcast service be informed of the protocol options selected to facilitate proper decoding and processing of the broadcast. In one embodiment, the CS 102 provides this information to the receiver as an overhead system parameter message, consistent with cdma2000 standard. An advantage to the receiver is the ability to receive the information immediately from the overhead message. In this way, the receiver may immediately determine whether the receiver has sufficient resources to receive the broadcast session. The receiver monitors the overhead system parameter messages. The system may implement a service option number corresponding to a set of parameters and protocols, wherein the service option number is provided in the overhead message. Alternately, the system may provide a set of bits or flags to indicate the different protocol options selected. The receiver then determines the protocol options for decoding the broadcast session correctly.

Within the AN are multiple interconnects or interfaces. In the embodiment described herein, the PCF 108 has a signaling connection with the PDSN 104, which will be referred to as the A11 interface. In addition, there is a connection for user traffic, which will be referred to as the A10 interface. The A10 interface is used to provide a path for user traffic between a PDSN 104 and a PCF 108 for packet data services. The BSC has a signaling connection with the PCF, which will be referred to as the A9 interface. In addition, there is a connection for user traffic, which will be referred to as the A8 interface. The A8 interface is used to provide a path for user traffic between a BSC and a PCF for packet data services.

Presented hereinbelow are various embodiments of methods and apparatus for negotiating transmission parameters for a BC service. The transmission parameters are referred to as generic capability of the BC service. A capability may include the type of header compression used, such as specifying the algorithm parameters, or may include any parameters used by the PDSN 110 and the MS 102, which may not necessarily be used by intervening system elements. For example, the MS 102 and the PDSN 110 both use the header compression to process transmissions. The PDSN 110 applies the header compression algorithm to compress the data prior to transmission. The MS 102 uses information about the header compression algorithm to extract the original information from the received information transmitted by the PDSN 110. While the PDSN 110 and the MS 102 use the header compression information to process data, the BSC 104 does not need to know the type of header compression applied. Header compression is provided as an exemplar of a generic capability; however, generic capabilities are not limited to header compression. A generic capability may be any parameter that at least two of the system elements require for proper processing of a transmission.

As in an uni-cast service, the MS 102 and PDSN 110 require a procedure to indicate or negotiate generic capabilities for broadcast/multicast service. As discussed hereinabove, these capabilities may include header compression algorithms, as well as algorithms and methods for directing the data packet flow to an appropriate A10 connection. The way the PDSN compresses the IP packets may be referred to as flow treatment. As used herein, a flow is a series of packets that share a specific instantiation of IETF protocol layers. For example, an RTP flow may consist of the packets of an IP/UDP/RTP protocol instantiation, all of which share the same source and destination IP addresses and UDP port number. When the PDSN receives IP packets it determines where to send the IP packets and how the packets are to be compressed. The PDSN mapping (a forwarding-type function) the IP packets to an A10 connection may be referred to as flow mapping.

According to one approach employed in a unicast service, an MS negotiates such capabilities with a corresponding PDSN during a Point-to-Point Protocol (PPP) Internet Protocol Control Protocol (IPCP) procedure. The MS then uses Multi-Channel Flow Treatment Protocol (MCFTP) to indicate the flow treatment information to the PDSN. MCFTP is developed in 3GPP2 and is described in the 3GPP2 document, P.S0001-B, "Wireless IP Network Standards," which is incorporated herein by reference. The apparatus and methods disclosed herein for providing the flow treatment and flow mapping information to the PDSN 206 are alternatives to MCFTP that provide certain benefits over MCFTP. This approach is not directly applicable to a broadcast/multicast service as the MS may have a PPP session established with a first PDSN, wherein the first PDSN is different from a second PDSN providing the broadcast/multicast content to the MS. In addition, the flow treatment that the MS indicates to the first PDSN is not applicable, as the first PDSN is not involved in the broadcast/multicast transport.

As illustrated in FIG. 1, the BSC 104 communicates with PCF 108 via an A8/A9 Interface. The PCF 108 may connect to one or more PDSN, such as PDSN 110 and 112, via an A10/A11 Interface as described in TIA/EIA/IS-2001A, Interoperability Specification (IOS) for cdman2000 Access Network Interfaces, August 2001. The broadcast/multicast content server, CS 116, sends media as IP packets to the PDSN 110. Note that MS 102 may have IP connectivity to more than one PDSN within the system at any given time.

Note that each broadcast/multicast service instance within a carrier network is uniquely identified by a Broadcast/Multicast Service Identifier, or ID, and an IP Multicast Address. When the MS 102 desires to subscribe to a particular broadcast/multicast service, the MS 102 retrieves a service description from CS 116. The service description may be provided by an out-of-band type mechanism as described in U.S. patent application Ser. No. 09/934,021, entitled "Method and Apparatus for Out of Band Transmission of Broadcast Service Option in a Wireless Communication System" by Nikolai Leung, filed on Aug. 20, 2001, assigned to the assignee hereof and hereby expressly incorporated by reference. From the service description, the MS 102 extracts the ID and the IP MC address, and is thus able to receive the service.

Note that the PDSN 110 may support and implement various types of compression to reduce the amount of traffic that is sent to the MS 102. For example, the PDSN 110 may support the following header compression algorithms: Van Jacobson TCP/IP header compression (RFC 1144), Header compression (RFC 2507), Compressed RTP/UDP/IP header (RFC 2508), Header stripping/generation technique, and Robust Header Compression (RFC 3095) (Wireless IP Network Standard, Document Identification Number 3GPP2 P.S0001-B).

When the PDSN 110 receives IP packets it determines where to send the IP packets and how the packets are to be compressed. The PDSN 110 mapping (a forwarding-type function) the IP packets to an A10 connection may be referred to as flow mapping.

Regarding flow mapping, to send the IP packets to the correct MS 102, the PDSN 110 accurately maps the incoming IP packets to a connection so that the packets may be transmitted to the correct MS 102. The IP packets are then sent to the BSC 104 via the PCF 108. The BSC 104 then sends the IP packets to the MS 102. Concerning flow treatment, the PDSN 110 compresses the IP packets using a determined compression method and then transmits the packets to the MS 102. The MS 102 then decompresses the IP packets.

Presented herein are various embodiments for negotiation and indication of generic capabilities for a broadcast/multicast service. According to a first embodiment, the generic capabilities are pre-configured in the BSC 104, wherein in response to a request for a particular BC service, the BSC 104 provides the generic capability information to the MS 102 and to the PDSN 110 based on a listing of available BC services and the corresponding capabilities. A second embodiment, similar to the first embodiment, pre-configures the PDSN 110 with the generic capability information, wherein in response to a request for a particular BC service, the BSC 104 queries the PDSN 110 for the generic capability information. According to a third embodiment, the PDSN 110 is pre-configured with the generic capability information, wherein the MS 102 queries the PDSN 110 directly for generic capability information via a PPP connection. In a fourth embodiment, the MS 102 queries the PCF 108, which in turn queries all of the PDSN in the system. The PDSN responsible for the BC responds to the query. Where multiple PDSN may support the BSC, the first to respond using multicast addressing obviates the need for the others to respond.

As discussed hereinabove, in the first embodiment, the generic capabilities are pre-configured in the BSC 104. When the MS 102 requests a particular BC service, the BSC 104 provides the generic capability information to the MS 102. In addition, the BSC 104 also provides the generic capability information to the PDSN 110. The BSC 104 stores and/or has access to the BC listing information. The BC listing information is a list of available BC services and the corresponding capabilities of each.

For each broadcast/multicast service within a carrier network, the generic capabilities of a PDSN, such as PDSN 110, in handling the broadcast/multicast service are pre-configured at the BSC, such as BSC 104. The MS 102 may learn the PDSN 110 capabilities for a given broadcast/multicast service by listening to the periodic overhead message sent by the BSC 104; however, the overhead message(s) contain capability information for those broadcast/multicast services which have already been setup. There are several mechanisms that may trigger the setup of the broadcast/multicast service. According to a first mechanism, the MS 102 sends a Registration message to the BSC 104, wherein the registration request dynamically triggers a setup. A second mechanism is for an operator to setup the service at the BSC 104.

Figure 2:
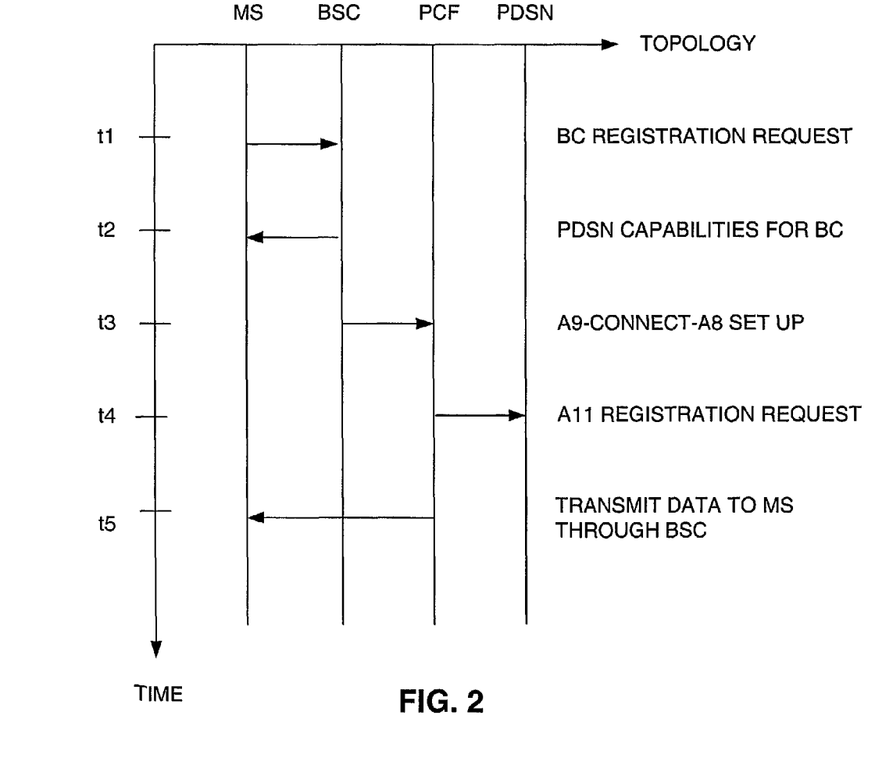
FIG. 2 is a flow diagram for negotiating transmission parameters in a communication system supporting broadcast transmissions.
Figure 3:
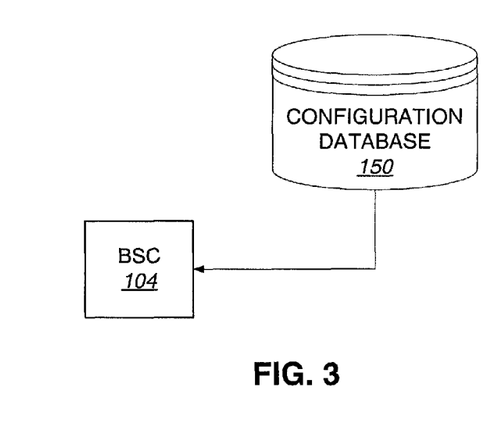
FIG. 3 is a block diagram of a portion of a communication system supporting broadcast transmissions.

FIG. 2 is a flow diagram illustrating the first embodiment of capability negotiation in a communication system supporting BC service. The horizontal axis represents the topology of the system, i.e., infrastructure elements. The vertical axis represents the time line. Any number of additional steps (not shown) may be incorporated into the procedure. At time t1 the MS 102 sends a BC registration request to the BSC 104 seeking to establish communication with the PDSN 110. The Registration message contains the ID (service identifier) and/or MC IP address. The MS 102 may obtain the ID and MC IP address from the service description from the CS 116, such as via an out-of-band transmission. The BSC 104 is pre-configured, i.e., has access to the BC listing database, with the generic capability information for the BC. As illustrated in FIG. 3, BSC 104 may be coupled to a configuration database 150, or alternatively, the configuration database 150 may be stored in a memory storage device within the BSC 104. The configuration database 150 is effectively a listing of each BC supported by the CS 116. Each BC is then mapped to a corresponding capability. In one embodiment, the configuration database 150 is maintained by an operator. In an alternate embodiment, the configuration database 150 is a database that is downloaded to the BSC 104.

Upon receipt of the Registration message, BSC 104 verifies that the generic capability information for PDSN 110 (or the PDSN associated with the BC) is available for the requested broadcast/multicast service. If the BSC 104 is pre-configured with the information, BSC 104 will broadcast the PDSN 110 capabilities in an overhead message via the air interface. Thus, at time t2 the BSC 104 sends the capability information to the MS 102. In addition, at time t3, BSC 104 performs an A9-connect-A8 set up procedure with PCF 108. BSC 104 informs the PCF 108, via an A9-Setup-A8 Message, the generic capabilities for the broadcast/multicast service. The PCF 108 relays this information to the PDSN 110, via the A11-Registration-Request Message, at time t4. Based on this information, PDSN applies appropriate treatment for the broadcast/multicast service. At time t5 the PDSN 108 begins to transmit data, as received from the CS, to the MS 102 through the BSC 104. Based on the received packet's IP multicast address, the PDSN forwards the packet to a PCF via the appropriate A10 connection corresponding to that IP multicast address. The PCF forwards data received from that A10 connection to its corresponding A8 connection destined for a BSC.

Figure 4:
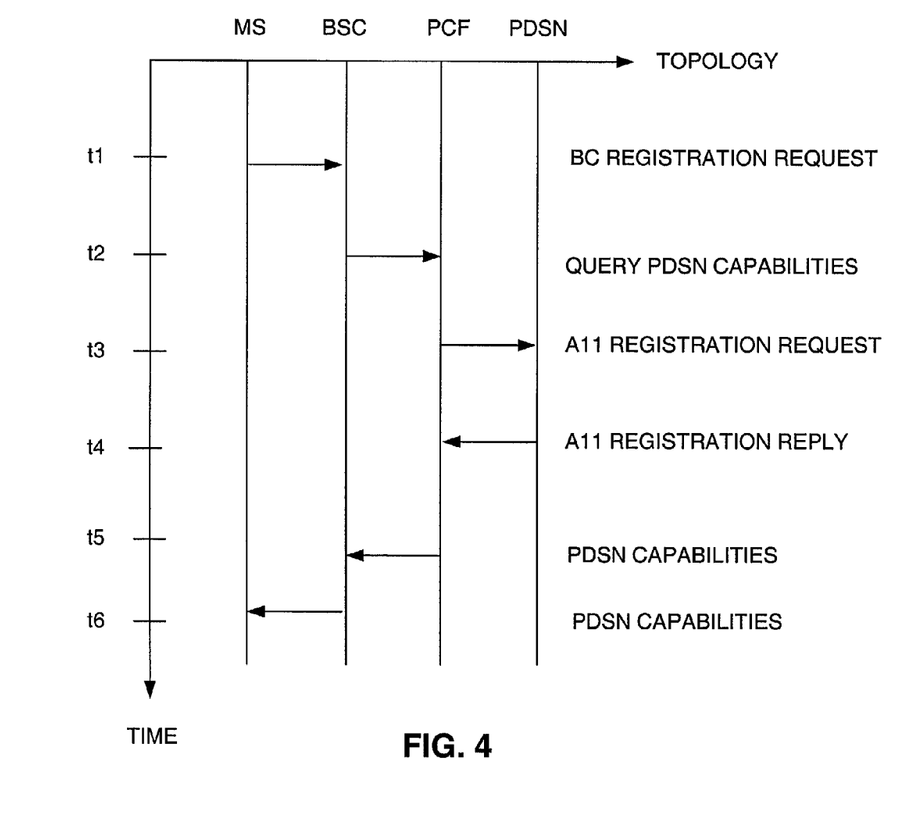
FIG. 4 is a flow diagram for negotiating transmission parameters in a communication system supporting broadcast transmissions.
Figure 5:
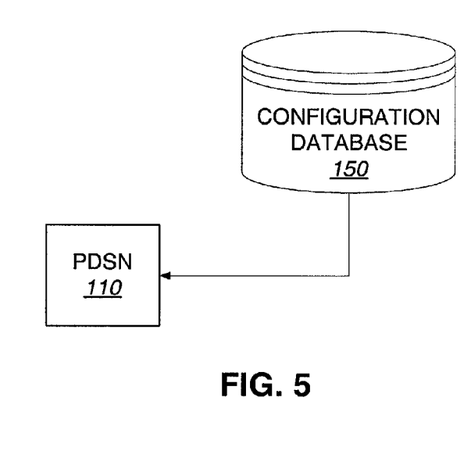
FIG. 5 is a block diagram of a portion of a communication system supporting broadcast transmissions.

The second embodiment, discussed hereinabove, is illustrated in FIGS. 4 and 5. According to the second embodiment, the MS 102 dynamically triggers the BC service setup as the BSC 104 is not pre-configured with the capability information. The MS 102 sends a request for a BC registration to the BSC 104 at time t1. The BC registration request identifies a particular BC service desired, such as stock quotes, news service, sporting event, etc. The BSC 104 receives the request, and identifies the PDSN 110 supporting the BC service. The BSC 104 then sends a query to the PDSN 110 (via the PCF 108) at time t2. The BSC 104 initiates the A9-Setup-A8 connection with the PCF 108 by sending an A9-Setup-A8 Message to PCF 108. The PCF forwards the query to the PDSN 110 using an A11-Registration-Request Message. The PCF 108 establishes an A11 connection with the PDSN 110 at times t3 and t4. PCF 108 forwards the PDSN 110 response to the BSC 104 via the A9-Connect-A8 message. Upon learning the PDSN 100 capabilities for handling the requested broadcast/multicast service, BSC 104 broadcasts the information in an overhead message via the air interface. Thus, as illustrated, the PCF 108 receives the capability information from the PDSN 110 at time t5 and the information is transmitted to the MS 102 at time t6. As illustrated in FIG. 5, the PDSN stores and/or has access to the configuration database 150. In one embodiment, there are several options for the BSC to identify the PDSN associated with the BC, including, but not limited to: (1) The BSC determines which PDSN based on the IP multicast address of the BC service (described in U.S. patent application Ser. No. 10/011,954, entitled "Method and Apparatus for Selecting a Packet Data Serving Node for Multicast/Broadcast Services" by Raymond Hsu; (2) The BSC is provisioned with the information that which PDSN is serving which BC service identified by the IP multicast address. In the first and second embodiments, the broadcast/multicast service setup was dynamically triggered by a MS registration.

In the first and second embodiments, the capabilities of a BC service may be broadcast periodically even without a specific request from the MS. This feature is useful during a window (e.g. plus/minus 10 minutes) around the beginning of a BC service (such as a certain sporting event), where a lot of peoples want to view the event. In this case, using request/query would overload both Reverse and Forward Common Signaling Channel. Thus, using the broadcast feature to advertise the capabilities for the BC service saves air resource. The capabilities of the BC service include, but are not limited to, the header compression capability, mapping between the IP multicast address and BCMCS_ID, etc.

Both the first and second embodiments provide the ability to the network of informing the MS of the generic capability of a PDSN for a particular broadcast/multicast service without requiring the MS to establish a PPP session. This, however, is balanced against less flexibility in negotiating different set of capabilities (e.g. header compression algorithm) for broadcast/multicast service other than advertised in the overhead message.

Figure 6:
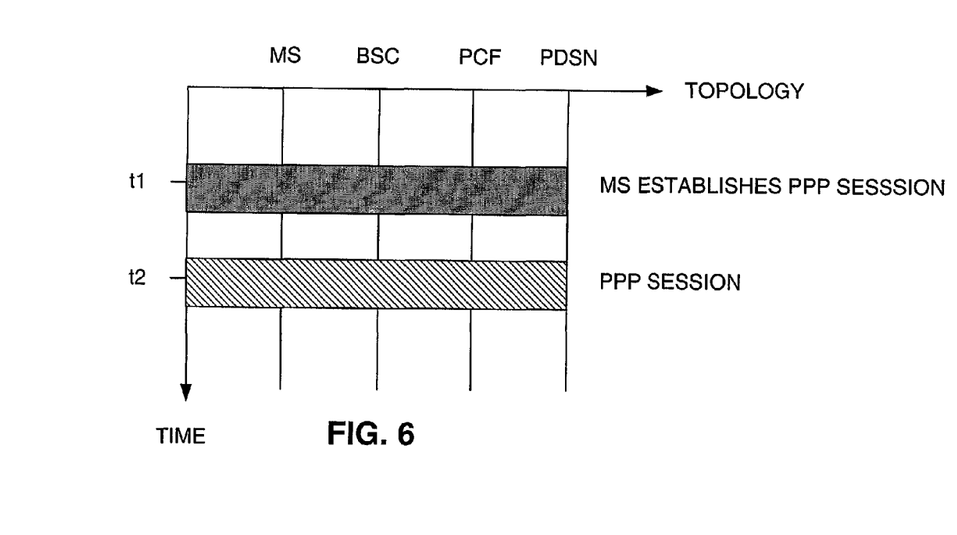
FIG. 6 is a flow diagram for negotiating transmission parameters in a communication system supporting broadcast transmissions.
Figure 7:
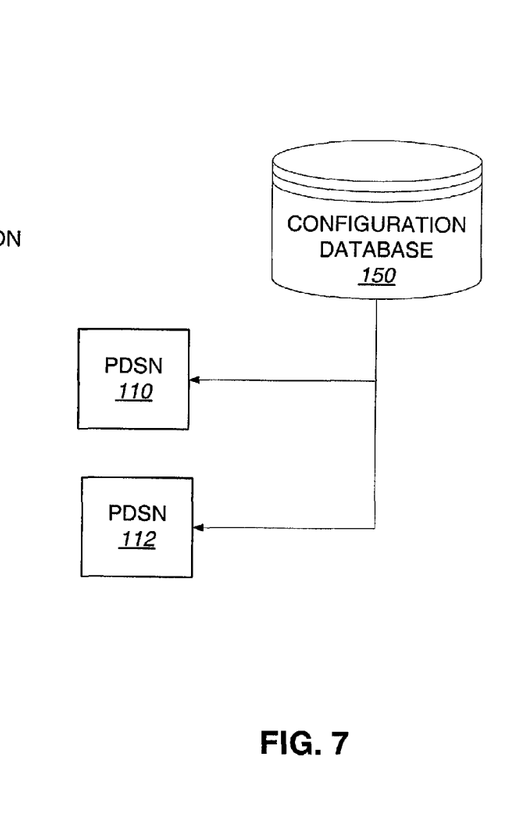
FIG. 7 is a block diagram of a portion of a communication system supporting broadcast transmissions.

According to the third embodiment, illustrated in FIGS. 6 and 7, generic capability for BC services are pre-configured at each PDSN in the network or system. Specifically, for each broadcast/multicast service instance in the carrier network, the corresponding generic capability (for handling the broadcast/multicast service) is pre-configured at all PDSN's within the carrier access network. To determine the capabilities for a desired broadcast/multicast service, the MS 102 first establishes a PPP session to a PDSN 110 as shown at time t1 of FIG. 6. This PDSN 110 may not necessarily be the PDSN supporting the broadcast/multicast media from the CS 116. Once the PPP session has been established, MS employs the Multi-Channel Flow Treatment Protocol (MCFTP) to discover the capabilities of the PDSN's that support the desired broadcast/multicast service at time t2. The MS 102 sends out a query requesting the capability information using MCFTP over PPP. As illustrated in FIG. 7 multiple PDSN store and/or have access to the configuration database 150.

The third embodiment provides a procedure that is transparent to BSC 104 and PCF 108, and any other intervening elements (not shown). MS 102 learns the generic capabilities for broadcast/multicast service regardless of which PDSN in the network is its MCFTP peer. In other words, it is not necessary that MS 102 establish a PPP connection with the PDSN supporting the broadcast session, as all of the PDSN are pre-configured with the capability information. The MS 102 may learn the capability information from a first PDSN, and then receive the broadcast session through a different PDSN. Further, since this capability information is not periodically broadcasted in the overhead message over the air interface, no air link resource is wasted.

On the other hand, application of the third embodiment may require each PDSN within the carrier access network be pre-configured with capabilities for all broadcast/multicast services, even though some PDSN are not capable of supporting broadcast/multicast service. It is possible that only a subset of PDSN within the carrier access network are able to support broadcast/multicast service. By making all PDSN within the network broadcast/multicast service aware introduces overhead into the process. For example, when change, the change is updated for each PDSN in the network. Further, the MS establishes a PPP session with a normal data call selecting Service Option 33 to run MCFTP. A disadvantage of using MCFTP to discover the capabilities for a BC service is that it is a unicast method that requires traffic channels to be established over the air. Using traffic channels for this purpose is not efficient over the air. On the other hand, the first and second embodiments may use common signaling channels, which is more efficient than using traffic channels, to transport the same information to the MS. Moreover, the first and second embodiments may broadcast the capabilities of a BC service over the Broadcast Common Channel, which is even more efficient over the air.

Figure 8:
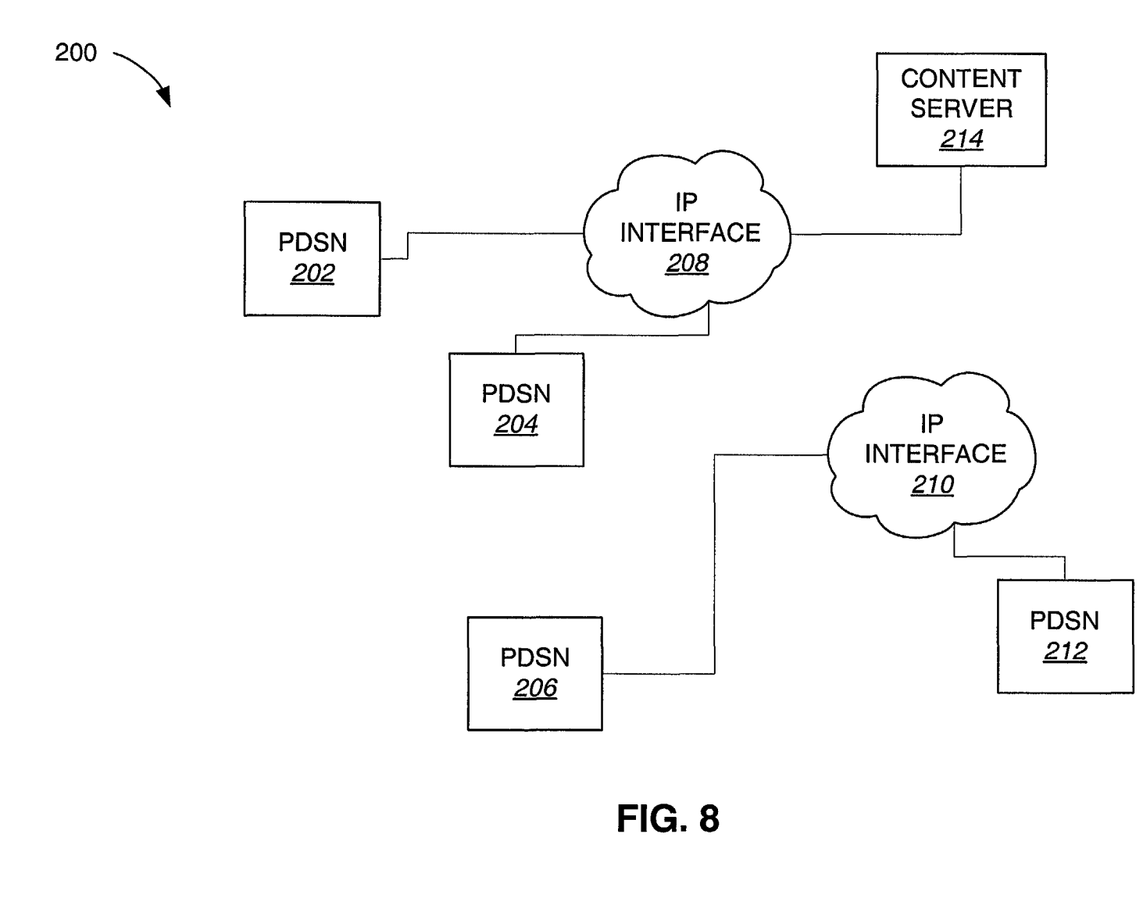
FIG. 8 is a block diagram of a communication system supporting broadcast transmissions.

In a fourth embodiment, the MS 102 uses MCFTP to learn the generic capability information for broadcast/multicast service, wherein the PDSN is pre-configured with the capability information. In contrast to the third embodiment, only those PDSN supporting the broadcast are pre-configured with capability information. In addition, unlike the third embodiment, it is not necessary for the MS to establish a PPP session to the PDSN supporting the broadcast/multicast flow. As illustrated in FIG. 8, a CS 214 communicates with PDSN 202 and 204 via IP interface 208. Also within the system 200 are PDSN 206 and 212 communicating with resources (not shown) via IP interface 210. The PDSN 206 and 212 may be in communication with any of a variety of other data sources. The MS, such as MS 102, may be in communication with any of the PDSN 202, 204, 206, and 212. Note that multiple PDSN may be in communication with MSs via a common PCF (not shown).

An MS (not shown) may establish a PPP session to PDSN 206, which is not receiving the broadcast content from CS 216. The MS uses MCFTP to query PDSN 206 for the generic capabilities of a desired broadcast/multicast service. Upon receiving the request, PDSN 206 uses an Inter-PDSN Protocol to request the capability information from PDSN 202 and/or PDSN 204, which each are receiving the broadcast content from CS 216. For example, PDSN 206 sends a query to a multicast group, wherein the group members are the PDSNs in a carrier network, such as system 200. The query requests the capability information associated with the broadcast/multicast service (identified by ID and MC IP address). The query is sent in the form of an IP MC packet addressed to the multicast group of PDSN members. In one embodiment, the group is identified by a reserved IP multicast address with administrative scoping such that the packet will not be forwarded outside the carrier network for security purpose.

Upon receiving the query, those PDSN supporting the designated broadcast/multicast service respond with the capability information. Other PDSN will discard the query with no action. The capability response is then sent to the same multicast group of PDSN members. As an optimization to reduce a flood of responses from multiple PDSNs to the same query, if a response is already sent by a PDSN, other PDSNs will see it and will not send the same response. Upon receiving the response, PDSN 206 uses MCFTP to provide the capability information to the requesting MS. Again, other PDSN will discard the response without action, i.e., silently.

Figure 9:
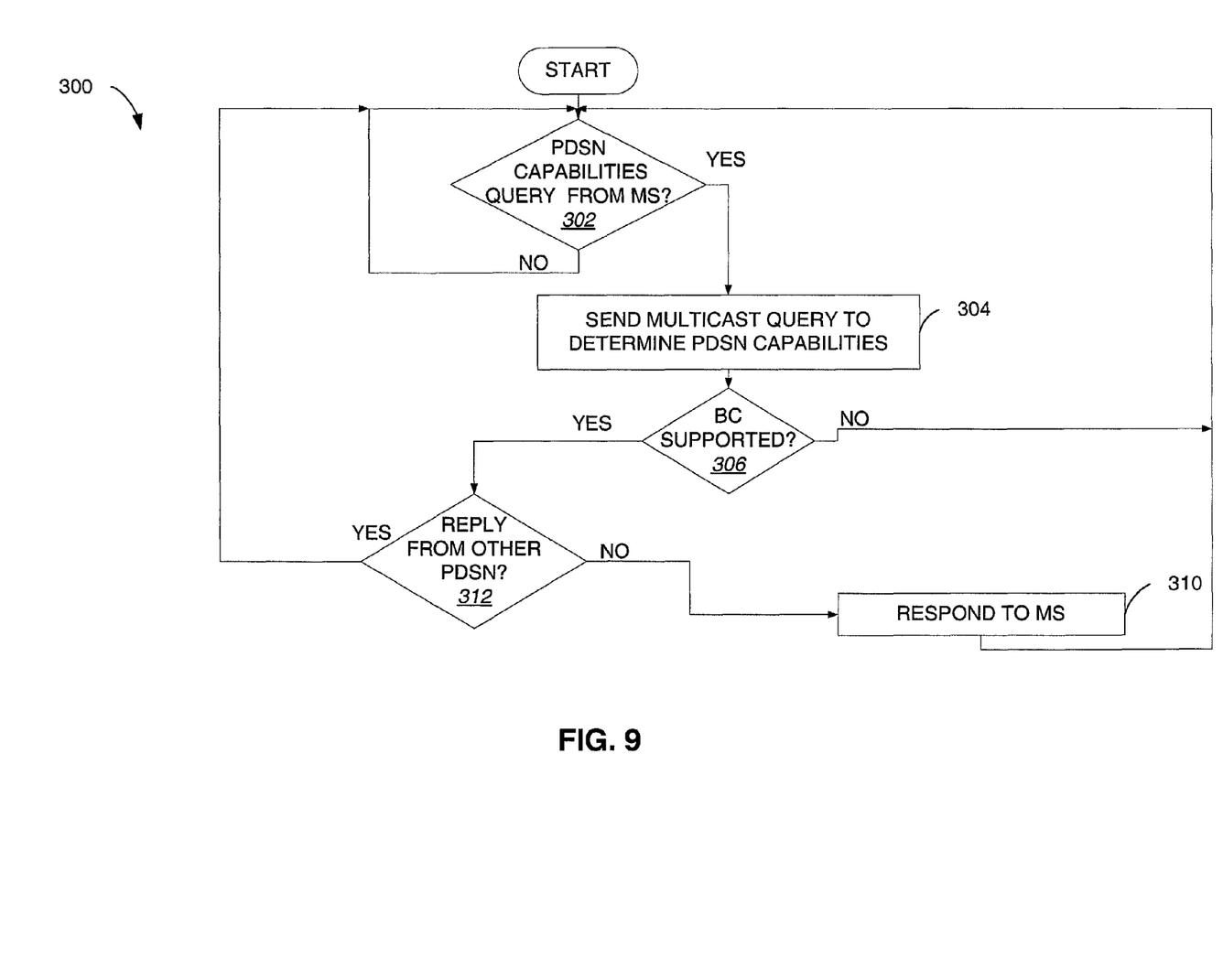
FIG. 9 is a flow diagram for negotiating transmission parameters in a communication system supporting broadcast transmissions.

The fourth embodiment is further illustrated in FIG. 9 as process 300. At decision diamond 302 the process waits for an MS query for the PDSN capability information. In response to the MS query, processing continues to step 304 to send a multicast query requesting the capability information. The multicast query may be sent to all of the PDSN in the network, or may be sent to a subset thereof. Each PDSN determines if the BC is supported, and if the PDSN supports the designated BC at decision diamond 306, processing continues to decision diamond 312. To determine if a reply was sent by another PDSN. If no reply was sent, the PDSN sends a reply at step 310; and if a reply was sent, processing returns to wait for next query from MS. If the PDSN does not support the designated BC at decision diamond 306, processing returns to wait for next query from MS.

According to the fourth embodiment, an MS need not necessarily connect to the PDSN supporting the broadcast/ multicast content. The generic capability of a given broadcast session may be obtained without this specific connection. An additional Inter-PDSN protocol, however, is used for exchanging information regarding serving PDSN's capabilities for broadcast/multicast service.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a communication system supporting broadcast services, a method comprising:
    pre-configuring a first infrastructure element with capability information for a first broadcast service, wherein pre-configuring the first infrastructure element comprises accessing a configuration database comprising the capability information for the first broadcast service, and wherein the capability information comprises a mapping between a BCMCS_ID and an IP multicast address;
    in response to a request from a mobile station for the first broadcast service, the first infrastructure element broadcasting the capability information to the mobile station in an overhead message in a control channel via an air interface;
    further in response to the request from the mobile station for the first broadcast service, setting up the first broadcast service between the first infrastructure element and a second infrastructure element by transmitting a setup message including the capability information from the first infrastructure element to the second infrastructure element, wherein the second infrastructure element comprises an upstream infrastructure element;
    further in response to the request from the mobile station for the first broadcast service and based on the setup message, receiving data packets corresponding to the first broadcast service from the second infrastructure element, wherein the data packets comprise a flow treatment corresponding to the capability information accessed from the configuration database; and
    broadcasting the data packets corresponding to the first broadcast service from the first infrastructure element to the mobile station, wherein the mobile station is operable to receive the broadcast of the data packets based on previously receiving the broadcast of the capability information accessed from the configuration database.

2. The method as in claim 1, wherein the capability information further comprises header compression information.

3. The method as in claim 1, further comprising: re-configuring the first infrastructure element to update the capability information.

4. The method as in claim 1, wherein the first infrastructure element is a base station controller.

5. The method as in claim 4, wherein the second infrastructure element is a packet data service node.

6. The method as in claim 1, wherein pre-configuring the first infrastructure element comprises establishing access to a plurality of capability information for a plurality of broadcast services from the configuration database.

7. A physical infrastructure element in a wireless communication system, comprising:
    circuitry configured to access a configuration database, the configuration database comprising capability information for a first broadcast service, wherein the capability information comprises a mapping between a BCMCS_ID and an IP multicast address;
    in response to a request from a mobile station for the first broadcast service, circuitry configured to broadcast the corresponding capability information to the mobile station in an overhead message in a control channel via an air interface;

further in response to the request from the mobile station for the first broadcast service, circuitry configured to set up the first broadcast service between the infrastructure element and a second infrastructure element by transmitting a setup message including the capability information from the infrastructure element to the second infrastructure element, wherein the second infrastructure element comprises an upstream infrastructure element;

further in response to the request from the mobile station for the first broadcast service and based on the setup message, circuitry configured to receive data packets corresponding to the first broadcast service from the second infrastructure element, wherein the data packets comprise a flow treatment corresponding to the capability information accessed from the configuration database; and circuitry configured to broadcast the data packets corresponding to the first broadcast service from the first infrastructure element to the mobile station, wherein the mobile station is operable to receive the broadcast of the data packets based on previously receiving the broadcast of the capability information accessed from the configuration database.

8. The infrastructure element as in claim 7, wherein the capability information comprises header compression information.

9. The infrastructure element as in claim 7, wherein the infrastructure element is a base station controller.

10. The infrastructure element as in claim 9, wherein the second infrastructure element is a packet data service node.

11. A method for providing capability information for a broadcast service or multicast service to a mobile station, the method comprising:

establishing, by a first Packet Data Server Node (PDSN) of a plurality of PDSNs in a carrier access network, a Point-to-Point Protocol (PPP) session with a mobile station requesting a broadcast/multicast service, wherein the first PDSN is not configured to support a broadcast/multicast service requested by the mobile station;

receiving, by the first PDSN in a Multi-Channel Flow Treatment Protocol (MCFTP) via the PPP session, a query from the mobile station for capability information for the requested broadcast/multicast service;

transmitting, by the first PDSN in response to the query and via an Inter-PDSN protocol, a request for the capability information related to the requested broadcast/multicast service to one or more of the plurality of PDSNs;

receiving, at the first PDSN, the capability information related to the requested broadcast/multicast service from a second PDSN of the plurality of PDSNs, wherein the second PDSN supports the requested broadcast/multicast service; and communicating, by the first PDSN in MCFTP via the PPP session, the capability information to the mobile station.

12. The method of claim 11, wherein transmitting, by the first PDSN in response to the query and via an Inter-PDSN protocol, a request for the capability information further comprises querying a multicast group comprising the plurality of PDSNs.

13. The method of claim 12, wherein querying the multicast group further comprises transmitting an Internet Protocol (IP) Multicast (MC) packet addressed to a reserved IP multicast address that maintains the packet within the carrier access network.

14. A packet data serving node (PDSN), comprising:

circuitry configured to establish, a Point-to-Point Protocol (PPP) session with a mobile station requesting a broadcast/multicast service, wherein the PDSN comprises a first PDSN of a plurality of PDSNs in a carrier access network, wherein the first PDSN is not configured to support a broadcast/multicast service requested by the mobile station;

circuitry configured to receive, in a Multi-Channel Flow Treatment Protocol (MCFTP) via the PPP session, a query from the mobile station for capability information for the requested broadcast/multicast service;

circuitry configured to transmit, in response to the query and via an Inter-PDSN protocol, a request for the capability information related to the requested broadcast/multicast service to one or more of the plurality of PDSNs;

circuitry configured to receive the capability information related to the requested broadcast/multicast service from a second PDSN of the plurality of PDSNs, wherein the second PDSN supports the requested broadcast/multicast service; and circuitry configured to communicate, in MCFTP via the PPP session, the capability information to the mobile station.

15. The PDSN of claim 14, wherein the request for the capability information is addressed to a multicast group comprising the plurality of PDSNs.

16. The PDSN of claim 15, wherein the request addressed to the multicast group further comprises an Internet Protocol (IP) Multicast (MC) packet addressed to a reserved IP multicast address that maintains the packet within the carrier access network.

* * * * *